OCTAMETHYLENEAMIDE-2,2′-p-PHENYLENE-BIS-ETHYLAMIDE COPOLYMER

Robert D. Evans, West Chester, and Arthur J. Yu, Swarthmore, Pa., assignors to American Viscose Corporation, Philadelphia, Pa., a corporation of Delaware
No Drawing. Filed Apr. 6, 1959, Ser. No. 804,066
6 Claims. (Cl. 260—78)

This invention relates to isomorphous copolyamides. More particularly this invention relates to isomorphous copolyamides of certain dicarboxylic acids, octamethylenediamine and 2,2′-p-phenylene-bis-ethylamine.

As a general rule, if part of the monomer used in making a homopolymer by a condensation reaction is replaced by a second monomer and a copolymer is formed comprising the first and second monomers, the melting point of the copolymer is lower than the melting point of the homopolymer of the first monomer. Also, the softness, flexibility and solubility of the copolymer is greater. It is believed that the second monomer that is copolymerized interrupts the chain regularity of the first monomer and introduces some longitudinal disorder in the polymer. As a result the degree of crystallinity of the copolymer is reduced and the copolymer is non-isomorphous. A measure or index of the crystallinity of the copolymer and whether it is isomorphous or non-isomorphous is the melting point. However, certain monomers can be copolymerized in certain proportions to form isomorphous copolymers. The melting point of the copolymer is either equal to or greater than the melting point of the homopolymer of one of the monomers. The copolymer may be considered as a homopolymer that has had a certain proportion of the monomer replaced by a second monomer. If the second monomer is such that it does not disturb the size, shape, geometrical pattern or crystalline lattice of the copolymer, the resulting copolymer is isomorphous.

This invention has for its object to provide isomorphus copolymers of certain dicarboxylic acids, and both octamethylenediamine and 2,2′-p-phenylene-bis-ethylamine.

In accordance with the present invention it has now been found that isomorphous copolyamides of the octamethylenediamine and 2,2′-p-phenylene-bis-ethylamine may be produced. 2,2′-p-phenylene-bis-ethylamine has the following structure:

The copolymer may be composed of certain proportions of the above diamines that have been reacted with a dicarboxylic acid with the general formula

wherein $n$ is a whole number of from 4 to 10 inclusive. These acids are adipic, pimelic, suberic, azelaic, sebacic, undecanedioic and dodecanedioic acid.

The copolymer of this invention is of high molecular weight and is normally solid. It may be formed into fibers, films and molded articles.

In making the copolymer in general, equal mol proportions of the octamethylenediamine and the dicarboxylic acid are reacted together to form the corresponding diammonium salt. Likewise, equal mol proportions of the 2,2′-p-phenylene-bis-ethylamine are reacted with the same acid to form the corresponding diammonium salt. The salts which are crystalline are separately recovered, washed and dried. The isomorphous copolymer is formed by condensing together certain mol proportions of the two diammonium salts. The mol proportions in which the two salts are mixed and reacted together are the mol proportions in which the octamethyleneamide and the 2,2′-p-phenylene-bis-ethylamide will be present in the resulting isomorphous copolymer. The mixed salts are covered with m-cresol and are heated to a high temperature at reduced pressure until the copolymerization is completed. The water that is formed is distilled off, then the m-cresol is distilled off. The copolymer that is recovered is broken up and ground to particle size.

In making the copolymer of this invention part of the octamethylenediammonium salt that would be reacted alone if the homopolymer were to be made is replaced by the 2,2′-p-phenylene-bis-ethylammonium salt and the two salts are reacted together to form the copolymer. The copolymer may be considered as the homopolymer of octamethyleneamide in which part of the octamethyleneamide is replaced by the 2,2′-p-phenylene-bis-ethylamide. The residue of the acid that is used is present throughout the copolymer and both amido groups are present.

In the present invention from 5 to 95 mol percent of the octamethyleneamide may be replaced by the 2,2′-p-phenylene-bis-ethylamide. The resulting copolymer which is isomorphous contains the octamethyleneamide and the 2,2′-p-phenylene-bis-ethylamide in the amount that the octamethyleneamide has been replaced. The copolymer contains from 5 to 95 mol percent of the octamethyleneamide and 95 to 5 mol percent of the 2,2′-p-phenylene-bis-ethylamide. Expressed in another way, of the total diamine residue in the copolymer 5 to 95 mol percent may be the octamethylenediamine residue and 95 to 5 mol percent may be the 2,2′-p-phenylene-bis-ethylamine residue.

In the following example which is illustrative of the invention an isomorphous copolymer of 60 mol percent octamethylenesebacamide and 40 mol percent 2,2′-p-phenylene-bis-ethyl sebacamide is formed.

Example 1

The octamethylenediamine and 2,2′-p-phenylene-bis-ethylamine are each separately reacted with sebacic acid to form the corresponding diammonium salts. Quantities equal to 60 mol percent of the octamethylenediammonium salt and 40 mol percent of the 2,2′-p-phenylene-bis-ethylammonium salt are mixed together and are transferred to a reaction vessel. The reactants are covered with m-cresol, the reaction vessel is immersed in a silicone oil bath and heating is started.

The heating cycle consists of four stages. (a) Heating at around 100° until a homogeneous solution is obtained. This takes about 15 to 30 minutes. (b) Raise the temperature gradually to 160–180° C. Water begins to distill over at this stage. The solution becomes more and more viscous and gradually turns opaque. This usually takes place after one to two hours. (c) Before the solution solidifies, temperature is raised to 230–260° to keep the copolymer solution in a molten state. The pressure is gradually reduced to remove the m-cresol by distillation. As more and more m-cresol is removed, the copolymer turns opaque and is about to solidify. (d) The pressure is reduced to below 0.5 mm. and the temperature is raised to 280–320°, depending on the melting point of the copolymer. These conditions are maintained for four hours. At this stage, the last trace of m-cresol is removed, and the copolymerization is nearly driven to completion.

At the end of copolymerization, the heating is discontinued, the evacuation stopped, and nitrogen is admitted to the system. The copolymer in the reaction flask is allowed to cool in the oil bath. This slow rate of cooling gives a well annealed copolymer, which does not adhere to the wall of the vessel. The glass vessel is then removed from the oil bath, and broken to remove the copolymer. The copolymer is chipped to small pieces, which are ground in a small Wiley mill, using a 20 mesh screen.

The determination of copolymer melting point is made by observing particles of the copolymer between crossed polarizers on the hot stage of a microscope. The melting point is taken as the temperature at which the last trace of crystallinity, as evidenced by birefringence, completely disappeared.

The melting point of the resulting copolymer is approximately 242° C.

In a similar manner the octamethylenediammonium salt and the 2,2'-p-phenylene-bis-ethylammonium salt may be reacted in various proportions from 5 to 95 mol percent of the one to 95 to 5 mol percent of the other. Likewise, the diammonium salts of the other dicarboxylic acids may be formed and reacted together to produce other embodiments of the copolymer.

We claim:

1. An isomorphous copolymer of octamethylenediamine, 2,2'-p-phenylene-bis-ethylamine and a dicarboxylic acid having the general formula $HOOC(CH_2)_nCOOH$ wherein $n$ is 4 to 10, the copolymer being composed of 5 to 95 mol percent of the octamethyleneamide and 95 to 5 mol percent of the 2,2'-p-phenylene-bis-ethylamide.

2. An isomorphous copolymer of 5 to 95 mol percent octamethyleneadipamide and 95 to 5 mol percent 2,2'-p-phenylene-bis-ethyladipamide.

3. An isomorphous copolymer of 5 to 95 mol percent octamethyleneazelamide and 95 to 5 mol percent 2,2'-p-phenylene-bis-ethylazelamide.

4. An isomorphous copolymer of 5 to 95 mol percent octamethylenesebacamide and 95 to 5 mol percent 2,2'-p-phenylene-bis-ethylsebacamide.

5. An isomorphous copolymer of 5 to 95 mol percent octamethyleneundecanediamide and 95 to 5 mol percent 2,2'-p-phenylene-bis-ethylundecanediamide.

6. An isomorphous copolymer of 5 to 95 mol percent octamethylenedodecanediamide and 95 to 5 mol percent 2,2'-p-phenylene-bis-ethyldodecanediamide.

References Cited in the file of this patent

UNITED STATES PATENTS

| | | |
|---|---|---|
| 2,451,695 | Schreiber | Oct. 19, 1948 |
| 2,464,693 | Kirk et al. | Mar. 15, 1949 |
| 2,685,573 | Wittbecker et al. | Aug. 3, 1954 |
| 2,891,088 | Condo et al. | June 16, 1959 |